United States Patent [19]
Purcell et al.

[11] Patent Number: 6,073,156
[45] Date of Patent: Jun. 6, 2000

[54] CIRCUIT AND METHOD FOR WRAP-AROUND SIGN EXTENSION FOR SIGNED NUMBERS USING REPLACEMENT OF MOST SIGNIFICANT BIT

[75] Inventors: Stephen C. Purcell, Mountain View; Nital P. Patwa, San Jose, both of Calif.

[73] Assignee: ATI International SRL, Barbados

[21] Appl. No.: 09/100,446

[22] Filed: Jun. 19, 1998

[51] Int. Cl.[7] .................................................. G06F 7/52
[52] U.S. Cl. .......................................... 708/629; 708/628
[58] Field of Search .................................... 708/620, 625, 708/627–629

[56] References Cited

U.S. PATENT DOCUMENTS

| | | | |
|---|---|---|---|
| 4,926,371 | 5/1990 | Vassiliadis et al. | 708/628 |
| 5,251,167 | 10/1993 | Simmonds et al. | 708/630 |
| 5,943,250 | 8/1999 | Kim et al. | 708/625 |
| 5,954,791 | 9/1999 | Green et al. | 708/625 |

*Primary Examiner*—Tan V. Mai
*Attorney, Agent, or Firm*—Skjerven, Morrill, MacPherson, Franklin & Friel LLP; Edward C. Kwok

[57] ABSTRACT

A multiplier is configured to multiply two signed values to generate sum and carry bit groups representing, in redundant form, a product of the first and second signed values. A sign determining circuit is configured generate a sign bit representing a sign of the product. An extension unit is configured to receive the sum most significant bit, the sign bit, and the carry most significant bit. The extension output terminal configured to carry a replacement bit and an extension bit, the replacement bit having a same weight as the sum most significant bit. The extension unit is structured such that the replacement bit has one binary state only if the sum most significant bit and the carry most significant bit are different. The extension unit is structured such that the extension bit has one binary state only if the sign bit is a binary zero and the sum most significant bit and the carry most significant bit are the same.

6 Claims, 6 Drawing Sheets

|  | INPUT VALUES | | | INTERMEDIATE VALUES | | EXTENSION OUTPUT VALUES | |
|---|---|---|---|---|---|---|---|
|  | S[11] | C[11] | SIGN | Y[12] | Y[11] | E[15:13] | E[12] |
| LINE 1 | 0 | 0 | 0 | 0 | 0 | 0 | 0 |
| 2 | 0 | 0 | 1 | 0 | 1 | 1 | 1 |
| 3 | 0 | 1 | 0 | 1 | 1 | 1 | 1 |
| 4 | 0 | 1 | 1 | 0 | 0 | 1 | 1 |
| 5 | 1 | 0 | 0 | 1 | 1 | 1 | 1 |
| 6 | 1 | 0 | 1 | 0 | 0 | 1 | 1 |
| 7 | 1 | 1 | 0 | 1 | 0 | 1 | 1 |
| 8 | 1 | 1 | 1 | 1 | 1 | 1 | 0 |

| | INPUT VALUES | | | INTERMEDIATE VALUES PREDICTED CARRY OUT | | OUTPUT VALUES | |
|---|---|---|---|---|---|---|---|
| | S[11] | C[11] | SIGN | Y[12] | Y[11] | E[15:12] | E[11] |
| LINE 1 | 0 | 0 | 0 | 0 | 0 | 0 | 0 |
| 2 | 0 | 0 | 1 | 0 | 1 | 1 | 0 |
| 3 | 0 | 1 | 0 | 1 | 1 | 1 | 1 |
| 4 | 0 | 1 | 1 | 0 | 0 | 1 | 1 |
| 5 | 1 | 0 | 0 | 1 | 1 | 1 | 1 |
| 6 | 1 | 0 | 1 | 0 | 0 | 1 | 1 |
| 7 | 1 | 1 | 0 | 1 | 0 | 0 | 0 |
| 8 | 1 | 1 | 1 | 1 | 1 | 1 | 0 |

CIRCUIT AND METHOD FOR WRAP-AROUND SIGN EXTENSION FOR SIGNED NUMBERS USING REPLACEMENT OF MOST SIGNIFICANT BIT

BACKGROUND OF THE INVENTION

A conventional Wallace tree employs booth recoding to multiply, for example, a 6-bit number A by a 6-bit number B to generate a 12-bit sum S and a 12-bit carry C. Sometimes the product A×B equals the sum of the sum S and carry C (C+S) such as in the following longhand multiplication. For clarity, commas are placed every four digits.

|  |  |  |
|---|---|---|
| 00,0001 | (1) | A |
| × 01,0001 | (17) | B |
| 0000,0000,0001 | (1) | first partial product |
| 0000,0000,0000 | (0) | second partial product |
| + 0000,0001,0000 | (16) | third partial product |
| 0000,0001,0001 | (17) | sum S |
| + 0000,0000,0000 | (0) | carry C |
| 0000,0001,0001 | (17) | A × B = C + S |

However, sometimes A×B does not equal C+S as in the following multiplication.

|  |  |  |
|---|---|---|
| 00,0001 | (1) | A |
| × 00,1010 | (10) | B |
| 1111,1111,1110 | (−2) | first partial product |
| + 1111,1111,1100 | (−4) | second partial product |
| 0000,0001,0000 | (16) | third partial product |
| 0000,0001,0010 | (18) | sum S |
| + 1111,1111,1000 | (4088) | carry C |
| 1,0000,0000,1010 | (4106) | S + C |

The above sum S+C can be interpreted as having a value of 4106 unsigned or −4088 in twos complement.

Conventionally, sum S and carry C are subsequently added in an adder having an output bit length the same as the bit lengths of sum S and carry C (e.g., 12 bits). The most significant carry-out bit is discarded so that the above sum S+C has a +10 value.

SUMMARY OF THE INVENTION

In accordance with the present invention, a circuit has a multiplier. The multiplier has two input terminal configured to respectively receive two signed values. The multiplier has a sum and carry output terminal configured to carry respective sum and carry bit groups representing, in redundant form, a product of the first and second signed values. The circuit includes a sign determining circuit configured generate a sign bit representing a sign of the product. The circuit includes an extension unit which includes three input terminals for receiving the sum most significant bit, the sign bit, and the carry most significant bit. The extension output terminal configured to carry a replacement bit and an extension bit, the replacement bit having a same weight as the sum most significant bit. The extension unit is structured such that the replacement bit has one binary state only if the sum most significant bit and the carry most significant bit are different. The extension unit is structured such that the extension bit has one binary state only if the sign bit is a binary zero and the sum most significant bit and the carry most significant bit are the same.

In accordance with the present invention, a method includes multiplying two signed values to obtain a sum and carry bit group representing, in redundant form, the product of the two signed values. The method includes determining a sign of the product, thereby generating a sign bit. The method includes generating a replacement bit, the replacement bit having one binary state only if just one of the sum most significant bit and the carry most significant bit are different.

In accordance with the present invention, a method includes providing a multiplier. The multiplier has two input terminal configured to respectively receive two signed values. The multiplier has a sum and carry output terminal configured to carry respective sum and carry bit groups representing, in redundant form, a product of the first and second signed values. The method also includes providing a sign determining circuit configured generate a sign bit representing a sign of the product. The method includes providing an extension unit which includes three input terminals for receiving the sum most significant bit, the sign bit, and the carry most significant bit. The extension output terminal configured to carry a replacement bit and an extension bit, the replacement bit having a same weight as the sum most significant bit. The extension unit is structured such that the replacement bit has one binary state only if the sum most significant bit and the carry most significant bit are different. The extension unit is structured such that the extension bit has one binary state only if the sign bit is a binary zero and the sum most significant bit and the carry most significant bit are the same.

The above circuit and methods predict whether an unwanted carry out is to occur when adding the sum and carry values in an adder that has more significant bit places than the most significant bits of the sum and carry values. Extension bits are provided which compensate for, or eliminate the unwanted carry out. The principles of the present invention will be more clearly understood in light of the following description and the accompanying claims.

DESCRIPTION OF THE INVENTION

The present invention is illustrated below with respect to specific embodiments. These embodiments are illustrative only and not limiting. Throughout the description and figures, like identification symbols indicate like elements except where otherwise noted.

When a redundant sum S and carry C are subsequently added in an adder with a wider bit width (e.g., 16 bits) than S and carry C each have (12 bits) such as when sum S and carry C are to be added into a 16-bit register having a value T, the most significant carry-out bit of the result is not discarded. For example, sum S and carry C resulting from the booth multiplication of 1 and 10 is 0000,0001,0010 and 1111,1111,1000, respectively. Simply adding sum S and carry C in a 16-bit adder does not give a correct result as shown in the following addition.

```
      0000,0001,0010  (18)     sum S
    + 1111,1111,1000  (4,088)  carry C
      0001,0000,0000,1010  (4,106)  S + C
```

In this instance, the carry-out bit received by the fourth most significant column is not discarded and thus causes an incorrect result. The present invention corrects this carry-out problem by performing a unique sign extension for sum S and carry C before the addition of sum S and carry C as described in detail below.

Figure 1:
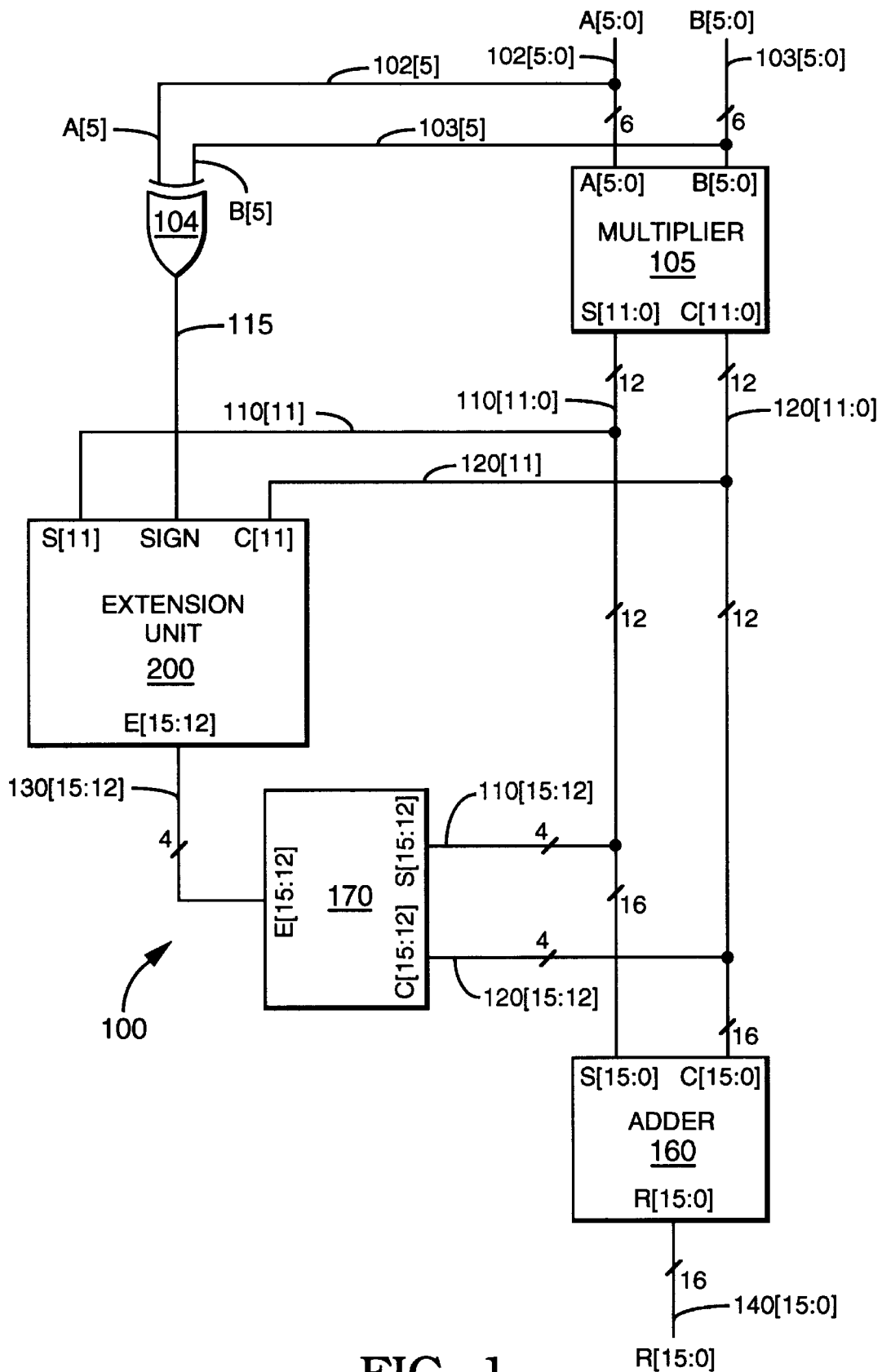
FIG. 1 shows a circuit which calculates an extended product of two input values according to one embodiment of the invention.

FIG. 1 shows a circuit 100 which calculates an extended product R[15:0] of two input values A[5:0] and B[5:0]. A multiplier 105 receives its signed input values A[5:0] and B[5:0] on respective buses 102[5:0] and 103[5:0] and provides sum bits S[11:0] on bus 110[11:0] and carry bits C[11:0] on bus 120[11:0]. An XOR gate 104 receives the sign bits A[5] and B[5] of the respective input values A[5:0] and B[5:0]. XOR gate 104 logically XOR's the bits A[5] and B[5] and generates a bit SIGN on line 115. SIGN is 1 if the product of A[5:0] and B[5:0] is negative. Otherwise, SIGN is positive.

Circuit 100 has an extension unit 200 which receives its input bits S[11], SIGN and C[11] on respective input lines 110[11], 115 and 120[11]. Extension unit 200 provides a 4-bit extension E[15:12] on extension bus 130[15:12].

Multiplexer 170 receives the extension bits E[15:12] on extension bus 130[15:12]. For each extension bit (e.g., E[13]), if the extension bit is 0, multiplexer 170 provides 0's as corresponding extension bits (e.g., S[13] and C[13]) of sum S and carry C on the corresponding lines (e.g., 110[13] and 120[13]) of extension buses 110[15:12] and 120[15:12]. If the extension bit (e.g., E[13]) is 1, multiplexer 170 asserts a 1 as the corresponding extension bit (e.g., S[13]) for one of sum S or carry C, and asserts a 0 for the corresponding extension bit (e.g., C[13]) of the other of the sum S or carry C. In one embodiment, extension bus 130[15:12] is connected directly to extension bus 110[15:12] such that E[15:12] is the same as S[15:12]. In this embodiment, 0's are provided on extension bus 120[15:12] as C[15:12].

Extension bus 110[15:12] is merged with bus 110[11:0] to form bus 110[15:0] while extension bus 120[15:12] is merged with bus 120[11:0] to form bus 120[15:0]. Adder 160 receives its input values S[15:0] and C[15:0] on respective input buses 110[15:0] and 120[15:0], and provides the resulting extended product R[15:0] on bus 140[15:0].

Circuit 100 is configured (as described below) to represent the product A[5:0]×B[5:0] in two's complement format with a 16-bit result R[15:0]. Multiplier 105 provides values of S[11:0] and C[11:0] such that the modulo $2^{12}$ of the sum S[11:0]+C[11:0] is the two's complement representation of the product A[5:0]×B[5:0]. In other words, the most significant carry-out bit is discarded. This is demonstrated in the following radix-2 booth multiplication example.

```
        00,0001   (+1)   A
      × 00,1010   (+10)  B
      1111,1111,1110  (−2)   first partial product
    + 1111,1111,1100  (−4)   second partial product
      0000,0001,0000  (+16)  third partial product
      0000,0001,0010  sum S
    + 1111,1111,1000  carry C
    1,0000,0000,1010  S + C
      0000,0000,1010  modulo $2^{12}$ (S + C) equals +10.
```

When S[11:0]+C[11:0] does not equal modulo $2^{12}$ (S[11:0]+C[11:0]), as in the above example, the value 1 of the most significant bit would create an incorrect result R[15:0] provided by adder 160 unless the carry-out bit is compensated for. This compensation is referred to as "wrap-around".

Figures 2, 3:
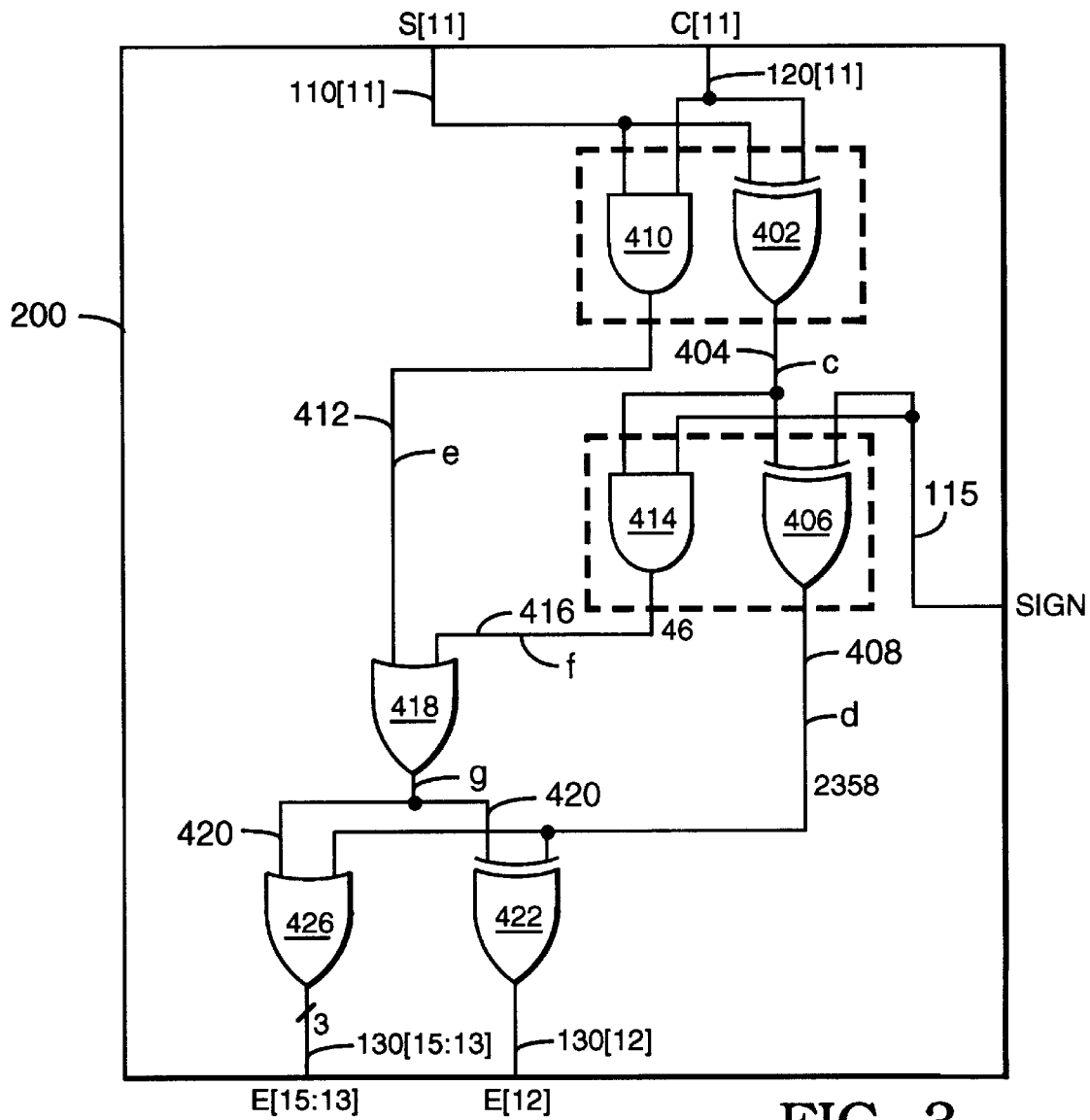
FIG. 2 is a truth table showing the extension output bits that result in the addition of the sum and carry values being the extended product of the two input values.
FIG. 3 shows an example of a gate level schematic of the extension unit of FIG. 1 which follows the truth table of FIG. 2.

FIG. 2 is a truth table showing the operation of extension unit 200. In particular, FIG. 2 shows the extension bits E[15:12] necessary to provide an extended product R[15:0] which represents A[5:0]×B[5:0]. Bits E[15:12] are shown for each combination of input bits S[11], C[11] and SIGN.

If the sum of S[11] and C[11] is greater than SIGN (lines 3, 5, 7 and 8 of FIG. 2) an unwanted carry out Y[12] of 1 is predicted to occur in adder 160. For each of these lines 3, 5, 7 and 8, there must be a carry out Y[12] of 1 in order for the addition of S[11], C[11] and Y[11] of common weight to result in the desired SIGN value. This unwanted carry out is compensated for be decrementing the extension bits E[15:12] to 1111 when SIGN is 0, and decrementing extension bits E[15:12] to 1110 when SIGN is 1. If the sum of C[11] and S[11] is equal to or less than SIGN (lines 1, 2, 4 and 6 of FIG. 2) an unwanted carry out Y[12] is predicted not to occur in adder 160 (i.e. Y[12] equals 0).

FIG. 3 shows an example of a gate level schematic of extension generator 300 which follows the truth table of FIG. 2. The existence of a carry-out bit Y[12] may be predicted by extension unit 200 of FIG. 3 as follows. An AND gate 410 receives its input bits S[11] and C[11] on respective lines 110[11] and 120[11] and provides the result bit e on line 412. Another AND gate 414 receives its input bits c and SIGN on respective lines 404 and 115 and provides the result bit f on line 416. An OR gate 418 receives its input bits e and f on respective lines 412 and 416 and asserts the result g on line 420. Signal g is 1 only if two or more of S[11], C[11] and SIGN are 1. Therefore, bit g is 1 only if there is to be an unwanted carry bit Y[12] to be generated in adder 160 that is to be compensated for.

An XOR gate 422 receives its input bits d and g on respective lines 408 and 420 and provides the resulting least significant extension bit E[12] on line 130[12]. Extension bit E[12] is 1 only if one or two of S[11], C[11] and SIGN are 1 (lines 2–7 of FIG. 2).

An OR gate 426 receives its input bits d and g on respective lines 408 and 420 and provides the resulting bit as each of extension bits E[15:13] on bus 110[15:13]. Extension bits E[15:13] are 111 unless none of S[11], C[11], and Y[11] are 1 (line 1 of FIG. 2).

Therefore, the extension unit 200 of FIG. 3 receives its input bits S[11], C[11] and SIGN, and provides extension bits E[15:12] according to the truth table of FIG. 2. For the above reasons, adder 160 produces an extended result R[15:0] which represents the extended two's complement representation of the product A[5:0]×B[5:0].

Figure 4:
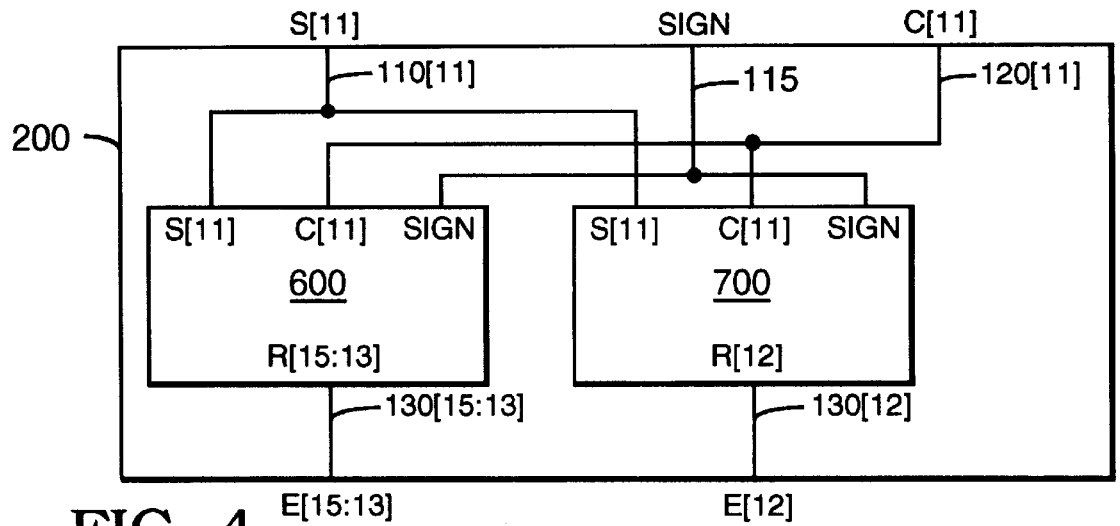
FIG. 4 shows another example of the extension unit of FIG. 1.

FIG. 4 shows another example of extension unit 200 of FIG. 2. Here, a more significant ("MS") extension generator 600 and a least significant ("LS") extension generator 700 each receive their input bits S[11], SIGN and C[11] on respective lines 110[11], 115 and 120[11]. In accordance with the truth table of FIG. 2, MS extension generator 600 asserts a 1 on each line of bus 110[15:13] unless all of S[11], C[11], and Y[11] are 0. LS extension generator 700 asserts a 1 on line 110[12] unless all of S[11], C[11], and Y[11] are the same binary state.

Figure 5:
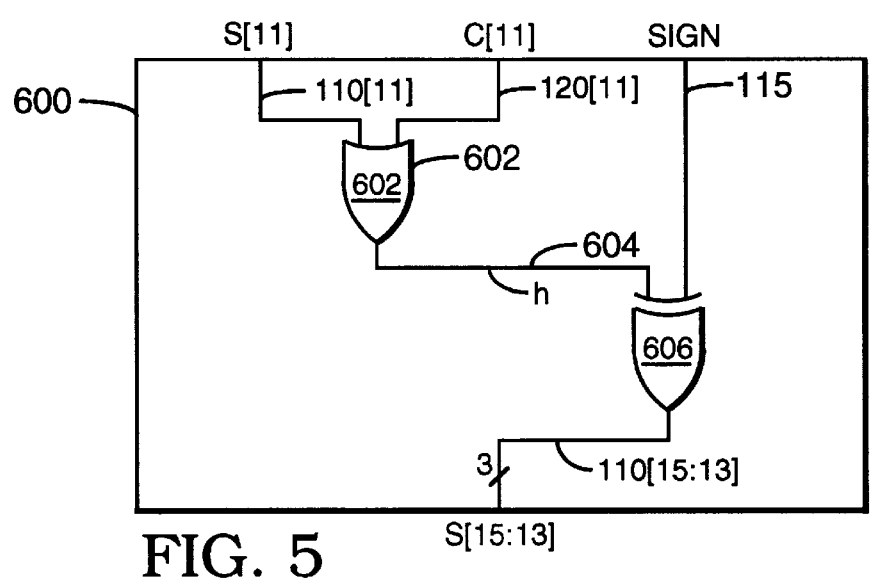
FIG. 5 shows a gate level structure of the MS extension generator of FIG. 4.

FIG. 5 shows a gate level structure of an example of the MS extension generator 600. An OR gate 602 receives its input bits S[11] and C[11] on respective lines 110[11] and 120[11] and provides the result bit h on line 604. Another OR gate 606 receives its input bits h and SIGN on respective lines 604 and 115 and provides the result as bits E[15:13] on bus 130[15:13].

Figure 6:
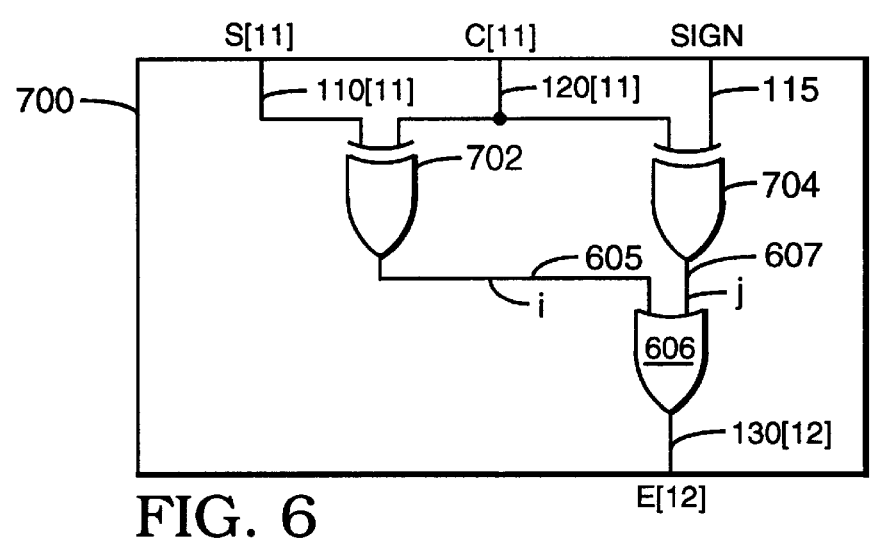
FIG. 6 shows a gate level structure of the LS extension generator of FIG. 4.

FIG. 6 shows a gate level structure of an example of the LS extension generator 700. An XOR gate 702 receives its input bits S[11] and C[11] on respective lines 110[11] and 120[11] and provides the result bit i on line 605. An XOR gate 704 receives its input bits C[11] and SIGN on respective lines 120[11] and 115 and provides the result bit j on line 607. OR gate 606 receives its input bits i and j on respective lines 605 and 607 and asserts the result as bits E[12] on bus 130[12].

Referring to FIG. 1, the appropriate sum and carry extensions S[15:12] and C[15:12] corresponding to extensions E[15:12] are provided on respective buses 110[15:12] and 120[15:12] as described above. Adder 160 receives its input bits S[15:0] and C[15:0] on respective buses 110[15:0] and 120[15:0], adds the bits, and provides the extended product R[15:0] on bus 140[15:0].

Figure 7:
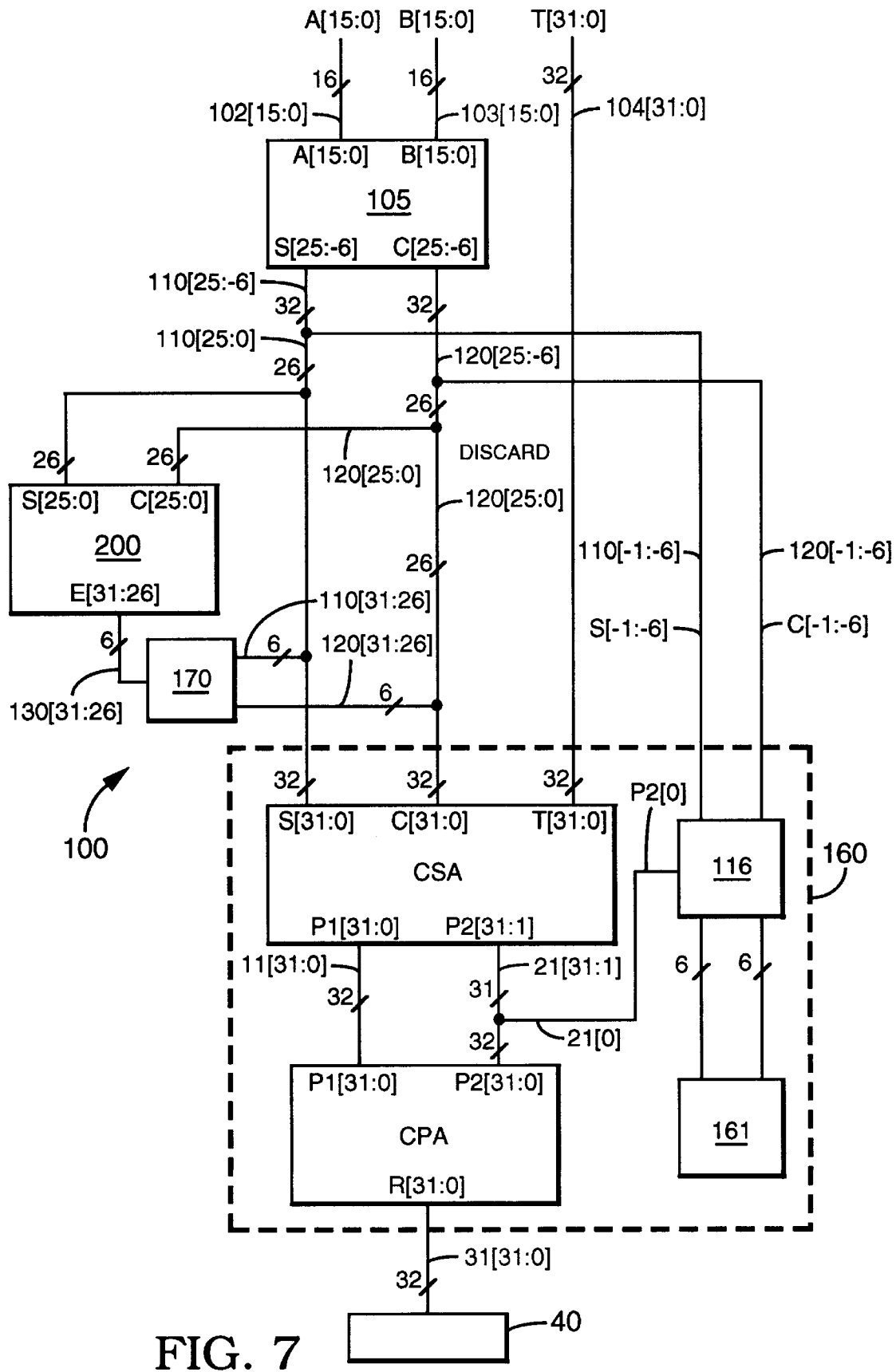
FIG. 7 shows a specific application of the circuit of FIG. 1 having 16-bit input values.

The input values A and B may be of a bit length other than the 6 bit length described above. For example, FIG. 7 shows a specific application of the circuit 100 of FIG. 1 having 16 bit input values A[15:0] and B[15:0].

Multiplier 105 receives the 16-bit input values and provides 32-bit sum and carry bits S[25:-6] and C[25:-6] on respective buses 110[25:-6] and 120[25:-6]. Portions of the sum and carry bits S and C may be input bits for a 6-bit adder 116 over buses 110[-1:-6] and 120[-1:-6]. Adder 116 produces a 6-bit sum and carry which may be discarded or provided to circuit 161 for further processing. Adder 116 also produces a 1-bit carry-out P2[0]. Extension unit 200 may provide extension lengths other than the 4 bits described above. In FIG. 7, a 6-bit extension E[31:26] is provided on bus 130[31:26]. Furthermore, adder 160 may add more than the two values C[31:0] and S[31:0] as in FIG. 7, where a value T[31:0] (e.g., a register value) is an input value to adder 160 over bus 104[31:0].

Adder 160 may be a two-stage adder (FIG. 7) in which a carry save adder CSA first receives its input values S[31:0], C[31:0], and T[31:0] over respective buses 110[31:0], 120[31:0], and 104[31:0]. CSA provides a sum and carry P1[31:0] and P2[31:1] over buses 11[31:0] and 21[31:1]. Next, a carry propagate adder CPA receives its input values P1[31:0] and P2[31:0] (P2[0] is supplied by adder 116) and provides a result R[31:0] on bus 31[31:0] which may be written to, for example, a register 40.

Figure 8:
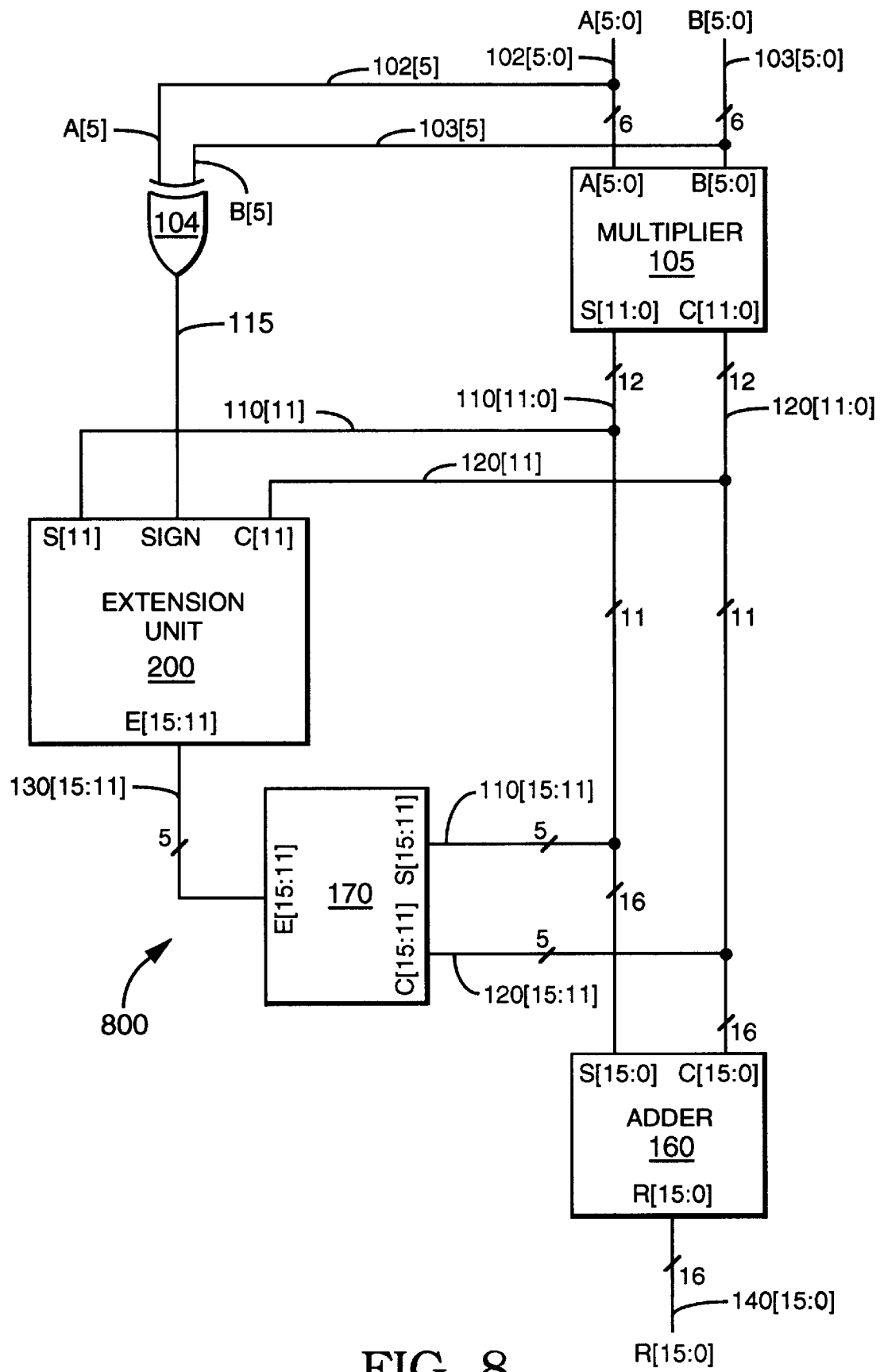
FIG. 8 shows another circuit that performs sign extension and most significant bit replacement.

FIG. 8 shows another circuit 800 which is similar to circuit 100 of FIG. 1 but differs as hereinafter provided. In circuit 800, extension unit 200 provides an additional value E[11] which replaces either S[11] or C[11]. The extension unit 200 of FIG. 8 receives its input bits S[11], C[11], and SIGN and provides resulting bits E[15:11] on bus 130[15:11] according to the truth table of FIG. 9.

Figures 9, 10:
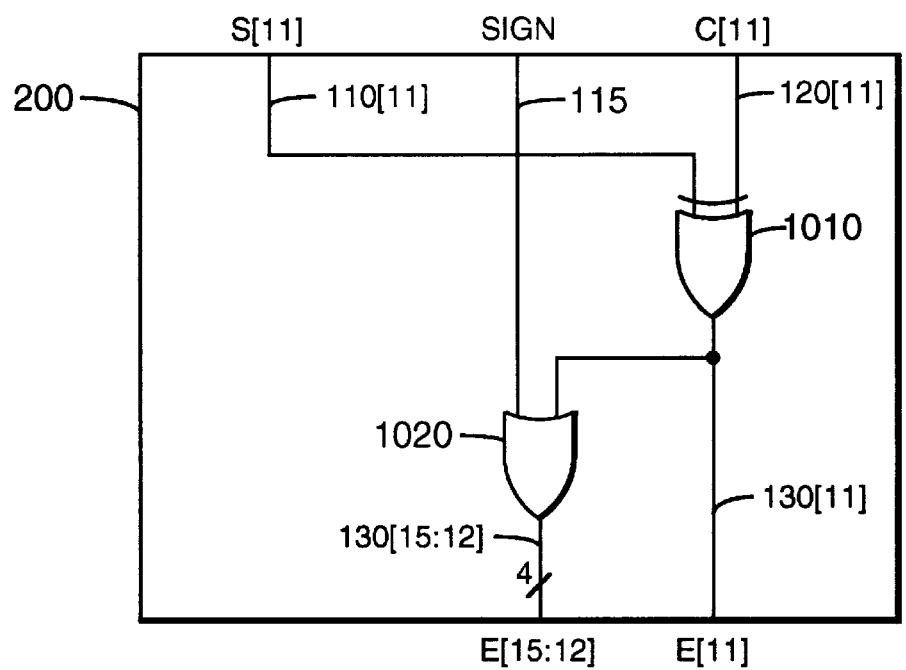
FIG. 9 shows a truth table that the extension unit of FIG. 8 follows.
FIG. 10 shows the extension unit of FIG. 8 circuit for implementing the truth table of FIG. 9.

In the embodiments described with respect to FIG. 1, the extensions E[15:12] were generated to compensate for any predicted unwanted carry Y[12] in adder 160. In the embodiment of FIGS. 8 and 9, the predicted carry-out bit is eliminated by replacing one of S[11] or C[11] with E[11] and the other of S[11] or C[11] with a 0. Note that the value of bits S[11] and C[11] provided by multiplexer 170 is not necessarily the same as the value of S[11] and C[11] provided by multiplier 105. Bits S[11] and C[11] from multiplexer 170 actually replace the bits S[11] and C[11] from multiplier 105.

In the truth table of FIG. 9, E[11] is 1 only if only one of S[11] and C[11] is a 1. Otherwise, E[11] is a 0. This ensures that the resulting bit R[11] does not change as a result of the substitution of one of S[11] or C[11] with E[11] and the substitution of the other of S[11] or C[11] with a 0.

In lines 1, 2, 4 and 6 of the truth table of FIG. 9, there is no predicted carry out Y[12]. Therefore, E[15:12] is 1111 if SIGN is 1, and is 0000 if SIGN is 0. In lines, 3, 5, 7 and 8, there is a predicted carry out Y[12] which must be eliminated or compensated for. In lines 7 and 8 carry out Y[12] is eliminated by replacing S[11] and C[11] of 1 and 1 with S[11] and C[11] of 0 and 0 (E[11] equals 0). The sign bits E[15:12] are 0000 for line 7 (SIGN equals 0) and 1111 for line 8 (SIGN equals 1). In lines 3 and 5, the predicted carry out is compensated for by providing extension bits E[15:12] of 1111 even though SIGN is 0.

FIG. 10 shows a circuit for implementing the truth table of FIG. 9. An XOR gate 1010 receives its inputs S[11] and C[11] on respective lines 110[11] and 120[11], and provides the extension bit E[11] (i.e., replacement bit) on line 130[11]. OR gate 1020 receives its inputs SIGN and E[11] on respective lines 115 and 130[11], and provides the result as extension bits E[15:12] on bus E[15:12].

Although logic elements which are directly connected by a line or bus are described above, a logic element may be coupled to another logic element such that signals represented at an output terminal of one of the logic elements are also carried on an input terminal of another of the logic elements. For example, it would be obvious to one skilled in the art to replace one of the direct connections with a connection having two inverters coupled in series between the two logic elements.

In this description and in the claims, "coupled" means "having an interaction in which there may, or may not, be intermediate components." For example, a receiver is coupled to a transmitter whether there be a medium of transport (a line) or whether there be no medium (as in the transmission of electromagnetic waves). The receiver is coupled to the transmitter because there is an interaction between the receiver and transmitter.

Although the present invention has been described with reference to specific embodiments, these embodiments are illustrative only and not limiting. Many other applications and embodiments of the present invention will be apparent in light of this disclosure and the following claims.

We claim:

1. A circuit comprising:
   (a) a multiplier comprising:
      a first and second input value terminal configured to respectively receive first and second signed input bit groups representing respective first and second signed values; and
      a sum and carry output terminal configured to carry respective sum and carry bit groups representing, in redundant form, a product of the first and second signed values;

(b) a sign determining circuit configured generate a sign bit representing a sign of the product;

(c) an extension unit comprising:

a sum, sign, and carry input terminal configured to respectively receive a sum most significant bit, the sign bit, and a carry most significant bit;

an extension output terminal configured to carry a replacement bit and an extension bit, the replacement bit having a same weight as the sum most significant bit, the extension unit structured such that the replacement bit has one binary state only if just one of the sum most significant bit and the carry most significant bit is a binary one, the extension unit structured such that the extension bit has one binary state only if the sign bit is a binary zero and the sum most significant bit and the carry most significant bit are the same.

2. The circuit of claim 2, wherein the extension unit comprises:

an XOR gate configured to receive the sum most significant bit and the carry most significant bit, the XOR gate configured to generate the replacement bit; and an OR gate configured to receive the sign bit and the replacement bit, the OR gate configured to generate the extension bit.

3. The circuit of claim 2, further comprising an adder configured to receive the sum bit group except for the sum most significant bit, the carry bit group except for the carry most significant bit, the replacement bit, and the extension bit.

4. A method comprising:

multiplying a first and second signed values in a multiplier, the first and second values represented by first a second signed input bit groups, thereby generating a sum bit group and a carry bit group representing, in redundant form a product of the first and second signed values;

determining a sign of the product, thereby generating a sign bit;

generating a replacement bit, the replacement bit having one binary state only if just one of the sum most significant bit and the carry most significant bit are different, otherwise having an binary state opposite the first binary state.

5. The method of claim 4, further comprising generating an extension bit, the extension bit having one binary state only if the sum most significant bit and the carry most significant bit are the same and only if the sign bit is a binary zero.

6. A method comprising:

(a) providing a multiplier comprising:

a first and second input value terminal configured to respectively receive first and second signed input bit groups representing respective first and second signed values; and a sum and carry output terminal configured to carry respective sum and carry bit groups representing, in redundant form, a product of the first and second signed values;

(b) providing a sign determining circuit configured generate a sign bit representing a sign of the product;

(c) providing an extension unit comprising:

a sum, sign, and carry input terminal configured to respectively receive a sum most significant bit, the sign bit, and a carry most significant bit;

an extension output terminal configured to carry a replacement bit and an extension bit, the replacement bit having a same weight as the sum most significant bit, the extension unit structured such that the replacement bit has one binary state only if just one of the sum most significant bit and the carry most significant bit is a binary one, the extension unit structured such that the extension bit has one binary state only if the sign bit is a binary zero and the sum most significant bit and the carry most significant bit are the same.

* * * * *